United States Patent [19]

Yoshida et al.

[11] Patent Number: 5,075,385

[45] Date of Patent: Dec. 24, 1991

[54] ELASTOMER COMPOSITION

[75] Inventors: Nobuyuki Yoshida; Hisao Tanaka, both Ichihara; Masahiro Fukuyama, Chiba, all of Japan

[73] Assignee: Sumitomo Chemical Company, Limited, Osaka, Japan

[21] Appl. No.: 626,096

[22] Filed: Dec. 4, 1990

Related U.S. Application Data

[62] Division of Ser. No. 351,663, May 15, 1989, Pat. No. 4,985,507.

[30] Foreign Application Priority Data

May 26, 1988 [JP] Japan ................ 63-128623

[51] Int. Cl.$^5$ ............................... C08F 8/00
[52] U.S. Cl. ............................ 525/327.3; 525/348; 525/352; 525/374; 525/381; 525/382; 525/386; 525/387
[58] Field of Search ............ 525/387, 348, 352, 374, 525/381, 382, 386, 327.3

[56] References Cited

U.S. PATENT DOCUMENTS 3,904,588  9/1975  Greene .
3,925,326 11/1979  Logothetis .
4,303,560 12/1981  Takahashi et al. .

FOREIGN PATENT DOCUMENTS 61-2712    1/1986  Japan .
61-266407 11/1986  Japan .
61-266408 11/1986  Japan .
61-266409 11/1986  Japan .
61-266410 11/1986  Japan .

*Primary Examiner*—Bernard Lipman
*Attorney, Agent, or Firm*—Stevens, Davis, Miller & Mosher

[57] ABSTRACT

A vulcanizable elastomer composition is prepared by blending 100 parts by weight of a copolymer containing
(A) 50–85% by mole of ethylene unit,
(B) 10–45% by mole of an alkyl acrylate unit having the formula (I),

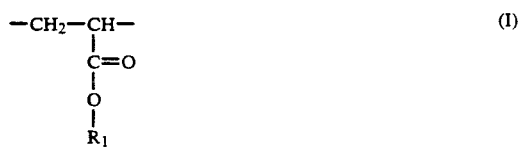

wherein $R_1$ is an alkyl having 1–8 carbon atoms,
(C) 2–35% by mole of an alkoxyalkyl acrylate unit having the formula (II),

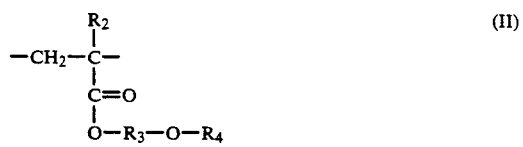

wherein $R_2$ is hydrogen or methyl, $R_3$ is an alkylene having 1–4 carbon atoms, and $R^4$ is an alkyl or alkoxyalkyl, each having 1–4 carbon atoms, and
(D) up to 5% by mole of a glycidyl ester unit having the formula (III),

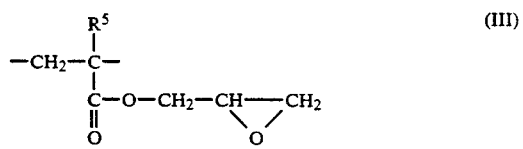

wherein $R^5$ is hydrogen or methyl, and 0.1–10 parts by weight of at least one vulcanizing agent.

The vulcanizable composition can give vulcanizates of well-balanced properties having an improved low-temperature resistance and retaining excellent oil resistance.

18 Claims, No Drawings

ELASTOMER COMPOSITION

This is a division of application Ser. No. 07/351,663, filed May 15, 1989, now U.S. Pat. No. 4,985,507.

The present invention relates to a vulcanizable elastomer composition. In more particular, it relates to an ethylene-copolymer type elastomer composition which can give vulcanizates having an excellent oil resistance and low-temperature resistance.

It is well known that marked advance in technology of various industries including automobiles, household electric appliances and machines in recent years requires a wide variety of properties to rubber materials used in various related parts and have developed various specialty elastomers which meet such requirements.

Such specialty elastomers already known include crosslinkable elastomer composition which is mainly composed of an ethylene copolymer derived from ethylene and an acrylic ester.

Specifically, JP-A-61-266407 through 266410 disclose ethylene copolymers obtained by modifying a copolymer derived from ethylene, alkyl acrylate and third component or ethylene, alkoxyalkyl acrylate and third component with an unsaturated amine, unsaturated alcohol, unsaturated carboxylic acid, etc. The ethylene copolymer disclosed therein is characterized in that it is obtained by modifying a copolymer comprising as monomer units ethylene, either an alkyl acrylate or an alkoxyalkyl acrylate, and further an acid anhydride group as the third component with an unsaturated amine, unsaturated alcohol, unsaturated carboxylic acid, etc.

Having a polar group in the side chain, the crosslinked compositions prepared from the above ethylene copolymers have an excellent oil resistance. However, they are still unsatisfactory in low-temperature resistance, therefore crosslinked compositions having both two resistances in a good balance has been desired.

According to the present invention, there is provided a vulcanizable elastomer composition which can give vulcanizates having an improved low-temperature resistance together with an excellent oil resistance, which composition having been derived from ethylene, acrylic ester and third component. It was impossible to obtain a vulcanizable composition giving vulcanizates having an excellent low-temperature resistance without damaging the oil resistance. The present inventors are the first to find a vulcanizable composition satisfying the following limitations gives vulcanizates exhibiting an excellent low-temperature resistance and oil resistance that have been difficult to simultaneously satisfy.

The present invention relates to a vulcanizable elastomer composition which comprises 100 parts by weight of a copolymer containing (A) 50–85% by mole of ethylene unit, (B) 10–45% by mole of an alkyl acrylate unit having the formula (I),

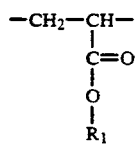

wherein $R_1$ is an alkyl having 1–8 carbon atoms, (C) 2–35% by mole of an alkoxyalkyl acrylalte unit having the formula (II),

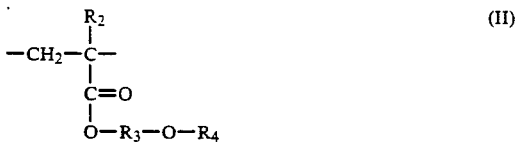

wherein $R_2$ is hydrogen or methyl, $R_3$ is an alkylene having 1–4 carbon atoms, and $R_4$ is an alkyl or alkoxyalkyl, each having 1–4 carbon atoms, and (D) 0–5% by mole of a glycidyl ester unit having the formula (III),

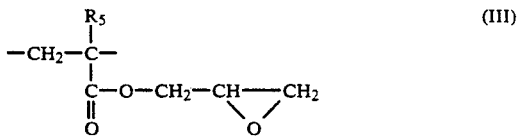

wherein $R_5$ is hydrogen or methyl, and 0.1–10 parts by weight of at least one vulcanizing agent.

The copolymer used in the present invention is obtained by copolymerizing the monomers which become contained as a unit in the copolymer.

The proportion of each monomer to be copolymerized may be determined so as to give a copolymer having an intended composition.

The ethylene unit (A), one of the units constituting the copolymer, has the following formula $$-CH_2-CH_2-.$$

The unit is derived from ethylene as a monomer.

The alkyl acrylate unit having the formula (I) is derived from an alkyl acrylate monomer.

Specific examples of alkyl acrylates are methyl acrylate, ethyl acrylate, n-butyl acrylate, tert-butyl acrylate, 2-ethylhexyl acrylate and the like. They may be used either alone or as in admixture thereof. Methyl acrylate is particularly preferable.

The alkoxyalkyl acrylate unit having the formula (II) is derived from an alkoxyalkyl acrylate monomer. Specific examples of the alkoxyalkyl acrylates are methoxymethyl acrylate, methoxyethyl acrylate, ethoxyethyl acrylate, butoxyethyl acrylate, methoxypropyl acrylate, ethoxypropyl acrylate, methoxymethyl methacrylate, ethoxymethyl methacrylate, ethoxyethyl methacylate, methoxyethyl methacrylate and the like. They may be used either alone or as in admixture thereof. Methoxyethyl acrylate and ethoxyethyl methacrylate are particularly preferable.

The glycidyl ester unit having the formula (III) is derived from an unsaturated glycidyl ester monomer.

Specific examples of unsaturated glycidyl esters are, as disclosed for example in JP-B-46-45085, glycidyl acrylate, glycidyl methacrylate, diglycidyl itaconate, triglycidyl butenetricarboxylate, glycidyl p-styrenecarboxylate and the like.

Particularly preferable is glycidyl methacrylate.

The proportion of the ethylene unit (A) constituting the copolymer of the present invention is 50–85% by mole, preferably 55–75% by mole, more preferably 65–75% by mole. When the proportion of the ethylene unit is less than 50% by mole, the resulting vulcanizate is poor in low-temperature resistance, whereas when it is more than 85% by mole, the vulcanizate shows a high permanent set and permanent compression strain and a low rubber elasticity.

The proportion of the alkyl acrylate unit (B) constituting the copolymer of the present invention is 10-45% by mole, preferably 12-35% by mole, more preferably 15-35% by mole. When the proportion of the alkyl acrylate unit is less than 10% by mole, the vulcanizate is poor in oil resistance, whereas when it is higher than 45% by mole, the vulcanizate is poor in low-temperature resistance.

The proportion of the alkoxyalkyl acrylate unit (C) constituting the copolymer of the present invention is 1-35% by mole, preferably 2-25% by mole, more preferably 2-15% by mole. When the proportion of the alkoxyalkyl acrylate unit is less than 1% by mole, the vulcanizate is not improved in low-temperature resistance, whereas when it is more than 35% by mole, the vulcanizate is poor in oil resistance.

The glycidyl ester (D), another unit constituting the copolymer of the present invention, may be introduced into the copolymer in a small proportion, for example up to 5% by mole, preferably 0.5-3% by mole, more preferably 0.5-1.5% by mole. The introduction of said glycidyl ester units enables to vulcanize the copolymer with agents other than organic peroxides, i.e. multifunctional organic amines, for example. When the glycidyl ester unit is not introduced, the copolymer is mainly vulcanized with organic peroxides.

Aside from the above-mentioned monomers forming the copolymer, a small amount of other comonomers copolymerizable with ethylene may be copolymerized. Specific examples of the comonomers are acrylic acid, methacrylic acid, maleic acid, maleic anhydride, isobutylene, styrene and the derivatives thereof, vinyl acetate, tetrafuloroethylene, hexafluoropropylene and the like.

The copolymer of the present invention may be prepared by a known method. For example, it can be prepared by free radical-initiated mass polymerization, emulsion polymerization, or solution polymerization. Some typical methods of polymerization are described in JP-B-46-45085. For example, the preparation may be conducted in the presence of an initiator which generates a free radical under a pressure of 500 kg/cm$^2$ or more and at a temperature of 40°-300° C.

The copolymers suitably used in the present invention, which is obtained by copolymerizing the above-mentioned components, are those having a melt index at 190° C. of 0.5-500 g/10 minutes determined according to JIS K6791, preferably 0.5-50 g/10 minutes, and an intrinsic viscosity [$\eta$] of 0.50-2.0 dl/g determined in xylene at 70° C.

The elastomer composition of the present invention comprises 100 parts by weight of the above-mentioned copolymer and 0.1-10 parts by weight, preferably 0.5-5 parts by weight of at least one vulcanizing agent. When the amount of the vulcanizing agent added exceeds 10 parts by weight, the tensile elongation percentage and the thermal resistance of the resulting product become unsatisfactory. When the amount of the vulcanizing agent added is less than 0.1 part by weight, no satisfactory crosslinking effect is obtained.

The vulcanization is carried out with at least one vulcanizing agent selected from the group consisting of organic peroxides, multifunctional organic amines or the salts thereof, organic carboxylic acid ammonium salts, dithiocarbamates, thiourea derivatives, and acid anhydrides.

The organic peroxides usable in the present invention include those of peroxyketal type, hydroperoxide type, dialkyl peroxide type, diacryl peroxide type, and peroxyester type organic peroxides. Specific examples thereof are dicumyl peroxide, di-t-butyl peroxide, t-butylperoxycumene, benzoyl peroxide, 2,5-dimethyl-2,5-di(t-butylperoxy)hexane and the like. They are selected in consideration of safety in handling, odor and other factors. The amount of the organic peroxide to be compounded is 0.1-10 parts by weight, preferably 1-10 parts by weight, more preferably 0.5-5 parts by weight relative to 100 parts by weight of the copolymer. And it may be varied depending upon the desirable properties of crosslinked product to be obtained.

The composition of the present invention may usually be incorporated, in order to enhance the crosslinking efficiency in the crosslinking effected by organic peroxides, with crosslinking assistants usually used in the art, for example p,p'-dibenzoylquinone dioxime, quinone dioxime, triallyl cyanurate, sulfur, ethylene dimethacrylate, N,N'-m-phenylene bismaleimide, triallyl isocyanurate, trimethylolpropane trimethacrylate and the like.

Specific examples of multifunctional organic amines and the salts thereof, organic carboxylic acid ammonium salts, dithiocarbamates, thiourea derivatives and acid anhydrides, which are useful vulcanizing agents for copolymers containing a glycidyl ester unit (D), are aliphatic amines such as polymethylenediamine and polyetherdiamine, ammonium benzoate, zinc dimethyldithiocarbamate, copper dimethyldithiocarbamate, phthalic anhydride, itaconic anhydride and the like. More specifically, the vulcanizing agents disclosed in JP-B-62-14568 may be used.

The elastomer composition of the present invention may be optionally incorporated at need with additives well known in the rubber industry. Such additives include vulcanization accelerators, processing assistants, zinc white, stearic acid, reinforcements, fillers, antioxidants, softeners, defoaming agents and the like.

Generally, to the elastomer composition of the present invention may be further added carbon black and/or plasticizers.

Suitable inorganic fillers include white fillers such as silica, talc, clay and the like. Suitable plasticizers are, for example, paraffinic plasticizers, polyester type plasticizers, polyether type plasticizers and the like. The amount of carbon black, inorganic fillers, and plasticizers to be added may be optionally selected depending upon the desirable properties of the product.

The elastomer composition thus obtained can be vulcanized at a temperature of 150°-230° C. for 5-45 minutes, preferably at 160°-190° C. for 10-30 minutes, to exhibit practically useful properties.

The elastomer composition of the present invention can also be vulcanized in a press, steam autoclave, or in hot air. The vulcanization thus obtained has a better ballance in oil resistance and low-temperature resistance than in prior art products, and can be suitably used for various hoses, diaphragms, packings, rolls, and belt materials.

The practice of the present invention will be specifically illustrated below with reference to Examples, but the invention should not be interpreted to be limited thereto. The properties of the elastomer composition were determined as follows.

METHOD FOR DETERMINING PHYSICAL PROPERTIES

The composition to be examined was vulcanized with a steam press at 170° C. for 20 minutes. The vulcanizate was then examined for physical properties and oil resistance and subjected to Gehman torsion test according to JIS K-6301. The oil resistance was examined by determining the degree of volume swelling after 70 hours of immersion at 150° C. in JIS No. 3 oil.

The low-temperature resistance was evaluated by determining the glass transition point (Tg) of unvulcanized rubber with a differential scanning calorimeter (DSC) and by Gehman torsion test of vulcanized rubber. The determination with a DSC was carried out under the following conditions.

DSC: Type DSC-2 (mfd. by The Perkin-Elmer Corp.): Temperature increasing rate: 20° C./min. Sensitivity: 0.5 mcal/sec. (in He atmosphere).

EXAMPLES 1-6

Method of Polymerizing Copolymers

Copolymer A

The copolymer was prepared by using a continuous reactor equipped with a stirrer having an internal volume of 2 liters. Thereto were continuously fed 13.5 kg/hour of ethylene, 1.0 kg/hour of methyl acrylate, 0.34 kg/hour of methoxyethyl acrylate, 1.0 g/hour of tert-butyl peroxypivalate (as 0.3% by weight n-heptane solution) as an initiator, and 0.45 kg/hour of methylcyclohexane as a chain transfer agent, as indicated in Table 1. Then the copolymerization was carried out at a pressure of 2100 kg/cm$^2$ and a temperature of 170° C.

The amount, melt index and constituents of the copolymers thus formed are collectively shown in Table 1.

Copolymer B

The copolymer was obtained with the same apparatus in the same manner as used for copolymer A. The condition of polymerization and the properties of the copolymer are shown in Table 1.

Copolymers C and D

The copolymers were obtained with the same apparatus in the same manner as used for copolymer A except that methoxyethyl acrylate was replaced by ethoxyechyl methacrylate. The conditions of polymerization and the properties of the copolymers obtained are shown in Table 1.

Copolymer E

The copolymer was obtained with the same apparatus in the same manner as used for copolymer A except that glycidyl methacrylate was further added to cause crosslinking.

The conditions of polymerization and the properties of the copolymer obtained are shown in Table 1.

Copolymer F

A copolymer of ethylene and methyl acrylate was obtained with the same apparatus in the same manner as used for copolymer A. The conditions of polymerization and the properties of the copolymer obtained are shown in Table 1.

EVALUATION OF PHYSICAL PROPERTIES OF VULCANIZATES

The copolymers A to F obtained as described above were mixed with the compounding ingredients in compounding ratios (in parts by weight) shown in Table 2, then kneaded and vulcanized on a 10-inch open roll to obtain vulcanizates.

The results of evaluation of the vulcanizates thus obtained are shown in Table 2 as Examples 1-6.

TABLE 1

| | | | Copolymer A | Copolymer B | Copolymer C | Copolymer D | Copolymer E | Copolymer F |
|---|---|---|---|---|---|---|---|---|
| Condition of copolymerization | Co-monomer feed rate | Methyl acrylate (kg/hr) | 1.0 | 0.56 | 1.1 | 1.0 | 1.1 | 1.5 |
| | | Methoxyethyl acrylate (kg/hr) | 0.34 | 0.63 | — | — | 0.34 | — |
| | | Ethoxyethyl methacrylate (kg/hr) | — | — | 0.14 | 0.31 | — | — |
| | | Glycidyl methacrylate (kg/hr) | — | — | — | — | 0.05 | — |
| | Ethylene feed rate (kg/hr) | | 13.5 | 13.7 | 14.1 | 14.3 | 13.0 | 16.0 |
| | Polymerization pressure (kg/cm$^2$) | | 2100 | 2100 | 2100 | 2100 | 2100 | 2100 |
| | Polymerization temperature (°C.) | | 170 | 170 | 170 | 170 | 180 | 180 |
| | Initiator | Species | TBPP[1] | — | — | — | — | — |
| | | Feed rate (g/hr) | 1.0 | 0.89 | 1.4 | 1.6 | 2.2 | 2.0 |
| | Chain transfer agent | Species | methyl-cyclohexane | n-Heptane | — | — | n-Heptane | — |
| | | Feed rate (g/hr) | 0.45 | 0.26 | — | — | 0.10 | — |
| Result of copolymerization | Amount of copolymer formed (kg/hr) | | 1.0 | 0.9 | 0.9 | 1.0 | 1.2 | 1.2 |
| | Melt index[2] (g/10 min) | | 9.0 | 9.9 | 12.7 | 13.2 | 10.0 | 23.0 |
| | Constituents | Ethylene (mol %) | 67.7 | 72.0 | 69.8 | 72.3 | 68.1 | 67.2 |
| | | Methyl acrylate (mol %) | 27.0 | 16.6 | 27.8 | 23.5 | 26.7 | 32.8 |
| | | Methoxyethyl acrylate (mol %) | 5.3 | 11.4 | — | — | 4.5 | — |
| | | Ethoxyethyl methacrylate (mol %) | — | — | 2.4 | 4.2 | — | — |
| | | Glycidyl methacrylate (mol %) | — | — | — | — | 0.7 | — |
| | [η] 70° C., xylene | | 0.84 | 0.95 | 0.83 | 0.83 | 0.82 | 0.81 |

Note:
[1] tert-Butyl peroxypivalate
[2] According to JIS K6760, 190° C.

TABLE 2

| | | Example 1 | Example 2 | Example 3 | Example 4 | Example 5 | Example 6 |
|---|---|---|---|---|---|---|---|
| Raw materials | Copolymer A | 100 | — | — | — | — | — |
| | Copolymer B | — | 100 | — | — | — | — |
| | Copolymer C | — | — | 100 | — | — | — |

TABLE 2-continued

|  |  | Example 1 | Example 2 | Example 3 | Example 4 | Example 5 | Example 6 |
|---|---|---|---|---|---|---|---|
|  | Copolymer D | — | — | — | 100 | — | — |
|  | Copolymer E | — | — | — | — | 100 | — |
|  | Copolymer F | — | — | — | — | — | 100 |
|  | FEF Black | 40 | 40 | 40 | 40 | 40 | 40 |
|  | Stearic acid | 1 | 1 | 1 | 1 | 1 | 1 |
|  | Nagard 445*[1] | 1 | 1 | 1 | 1 | 1 | 1 |
|  | Dicumyl peroxide | 2.5 | 2.5 | 2.5 | 2.5 | — | 2.5 |
|  | Acryl ester ED*[2] | 2 | 2 | 2 | 2 | — | 2 |
|  | Ammonium benzoate | — | — | — | — | 1 | — |
| Properties of vulcanizate | Tensile strength (kgf/cm$^2$) | 152 | 142 | 155 | 137 | 153 | 147 |
|  | Elongation (%) | 450 | 370 | 450 | 480 | 300 | 460 |
|  | Hardness (A-type hardness meter) | 60 | 59 | 59 | 57 | 65 | 59 |
| Oil resistance | Degree of volume swelling (%) | 92.4 | 96.9 | 112.3 | 120.0 | 90.0 | 105.5 |
| Low temp. property | Gehman Torsion test |  |  |  |  |  |  |
|  | $T_2$ (°C.) | −61.5 | −21.0 | −14.5 | −12.5 | −16.0 | −9.0 |
|  | $T_5$ (°C.) | −30.5 | −35.0 | −29.8 | −29.7 | −31.2 | −25.5 |
|  | DSC method |  |  |  |  |  |  |
|  | Tg (°C.) | −49.5 | −56.4 | −45.9 | −49.5 | −49.3 | −39.4 |

Note:
*[1] Transde name of antioxidant, mfg. by Uniroyal Inc. bis(2'-phenyl-4-isopropylphenyl)amine
*[2] Ethylene dimethacrylate, mfd. by Mitsubishi Rayon Co., Ltd.

According to the present invention, there is provided a vulcanizable composition which can give vulcanizates of well-balanced properties having an improved low-temperature resistance and retaining excellent oil resistance.

What is claimed is:

1. A vulcanizable elastomer composition comprising: 100 parts by weight of a copolymer containing
   (A) 50–85% by mole of ethylene unit,
   (B) 10–45% by mole of an alkyl acrylate unit having the formula (I),

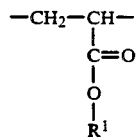

wherein $R^1$ is an alkyl having 1–8 carbon atoms,
   (C) 2–35% by mole of an alkoxyalkyl acrylate unit having the formula (II),

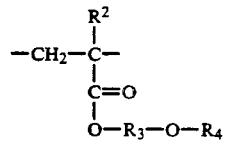

wherein $R^2$ is hydrogen or methyl, $R^3$ is an alkylene having 1–4 carbon atoms, and $R^4$ is an alkyl or alkoxyalkyl, each having 1–4 carbon atoms, and
   (D) a glycidyl ester unit in an amount of 0.5–5% by mole, said glycidyl ester unit having the formula (III),

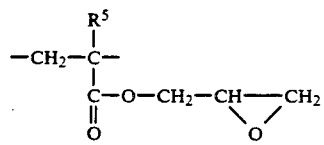

wherein $R^5$ is hydrogen or methyl, and 0.1–10 parts by weight of at least one vulcanizing agent.

2. An elastomer composition according to claim 1, wherein the alkyl acrylate (B) is at least one member selected from the group consisting of methyl acrylate, ethyl acrylate, n-butyl acrylate, tert-butyl acrylate and 2-ethylhexyl acrylate.

3. An elastomer composition according to claim 1, wherein the alkyl acrylate (B) is methyl acrylate.

4. An elastomer composition according to claim 1, wherein the alkoxyalkyl acrylate (C) is at least one member selected from the group consisting of methoxymethyl acrylate, methoxyethyl acrylate, ethoxyethyl acrylate, butoxyethyl acrylate, methoxypropyl acrylate, ethoxypropyl acrylate, methoxymethyl methacrylate, ethoxymethyl methacrylate, ethoxyethyl methacrylate and methoxyethyl methacrylate.

5. An elastomer composition according to claim 1, wherein the alkoxyalkyl acrylate (C) is at least one member selected from the group consisting of methoxyethyl acrylate and ethoxyethyl methacrylate.

6. An elastomer composition according to claim 1, wherein the glycidyl ester (D) is at least one member selected from the group consisting of glycidyl acrylate, glycidyl methacrylate, diglycidyl itaconate, triglycidyl butenetricarboxylate and glycidyl p-styrenecarboxylate.

7. An elastomer composition according to claim 1, wherein the glycidyl ester (D) is glycidyl methacrylate.

8. An elastomer composition according to claim 1, wherein the content of ethylene unit (A) in the copolymer is 55–75% by mole.

9. An elastomer composition according to claim 1, wherein the content of ethylene unit (A) in the copolymer is 65–75% by mole.

10. An elastomer composition according to claim 1, wherein the content of alkyl acrylate unit (B) in the copolymer is 12–35% by mole.

11. An elastomer composition according to claim 1, wherein the content of alkyl acrylate unit (B) in the copolymer is 15–35% by mole.

12. An elastomer composition according to claim 1, wherein the content of alkoxyalkyl acrylate unit (C) in the copolymer is 2–25% by mole.

13. An elastomer composition according to claim 1, wherein the content of alkoxyalkyl acrylate unit (C) in the copolymer is 2-15% by mole.

14. An elastomer composition according to claim 1, wherein the content of glycidyl ester unit (D) is 0.5-3% by mole.

15. An elastomer composition according to claim 1, wherein the content of glycidyl ester unit (D) is 0.5-1.5% by mole.

16. An elastomer composition according to claim 1, wherein the amount of the vulcanizing agent compounded therein is 0.5-5 parts by weight.

17. An elastomer composition according to claim 1, wherein the content of glycidyl ester unit (D) is 0 (zero) and the vulcanizing agent is an organic peroxide.

18. A vulcanizate obtained by vulcanizing the elastomer composition according to claim 1.

* * * * *